(12) United States Patent
Escobar K'David

(10) Patent No.: US 11,381,949 B2
(45) Date of Patent: Jul. 5, 2022

(54) WIRELESS WEARABLE PUSH-TO-TALK (PTT) DEVICE

(71) Applicant: Carlos Eduardo Escobar K'David, Rosharon, TX (US)

(72) Inventor: Carlos Eduardo Escobar K'David, Rosharon, TX (US)

(*) Notice: Subject to any disclaimer, the term of this patent is extended or adjusted under 35 U.S.C. 154(b) by 0 days.

(21) Appl. No.: 15/904,372

(22) Filed: Feb. 25, 2018

(65) Prior Publication Data

US 2019/0274022 A1    Sep. 5, 2019

(51) Int. Cl.
*H04W 4/80* (2018.01)
*H04W 4/10* (2009.01)

(52) U.S. Cl.
CPC ............... *H04W 4/80* (2018.02); *H04W 4/10* (2013.01)

(58) Field of Classification Search
CPC .................................. H04W 4/80; H04W 4/10
USPC .............................................. 455/41.1–41.3
See application file for complete search history.

(56) References Cited

U.S. PATENT DOCUMENTS

| | | | |
|---|---|---|---|
| 9,392,851 B2 | 7/2016 | Lam | |
| 9,480,096 B1* | 10/2016 | Lee | H04W 8/005 |
| 2007/0178950 A1 | 8/2007 | Lewis et al. | |
| 2012/0135685 A1* | 5/2012 | Higgins | H04B 1/385 |
| | | | 455/41.2 |
| 2014/0120983 A1* | 5/2014 | Lam | H04W 84/18 |
| | | | 455/557 |
| 2015/0098309 A1 | 4/2015 | Adams et al. | |
| 2015/0206424 A1* | 7/2015 | Tran | G08C 17/02 |
| | | | 455/41.2 |
| 2015/0277559 A1 | 10/2015 | Vescovi et al. | |
| 2016/0233946 A1 | 8/2016 | Wengrovitz et al. | |
| 2018/0063625 A1* | 3/2018 | Boesen | G06F 3/011 |

(Continued)

FOREIGN PATENT DOCUMENTS

CN     104718740 B     6/2018
KR     20150029452 A   3/2015

OTHER PUBLICATIONS

"DigiOptix Bone Conduction Camera Glasses", Kickstarter, retrieved from "https://www.kickstarter.com/projects/camemoryusa/digioptix-bone-conduction-camera-glasses", pp. 1-21, Aug. 19, 2019.

(Continued)

*Primary Examiner* — Yuwen Pan
*Assistant Examiner* — Angelica M Perez

(57) ABSTRACT

A wireless wearable Push-To-Talk (PTT) device is disclosed which is capable of enabling three or more short-range communication accessories. In specific, the wearable Push-To-Talk device can be connected to multiple short-range communication accessories such as a hearing accessory, a visual accessory and a wearable Push-To-Talk control accessory through a heterogeneous communication unit provided therein. A Bluetooth radio transceiver and a cellular radio transceiver are configured in said heterogeneous communication unit to transmit or receive radio signals. The heterogeneous communication unit supports the Bluetooth communication between the Push-To-Talk system and other short-range communication accessories either simultaneously or individually. The Push-To-Talk device along with multiple short-range communication accessories assists the operator with an efficient and secured communication.

5 Claims, 4 Drawing Sheets

(56) References Cited

U.S. PATENT DOCUMENTS

2018/0077541 A1* 3/2018 Maryaskin .............. H04W 4/10
2018/0109765 A1   4/2018 Wu
2019/0155385 A1* 5/2019 Lim ................... H04L 63/0861

OTHER PUBLICATIONS

"Fin : Wearable Ring", Indiegogo, retrieved from "https://www.indiegogo.com/projects/fin-wearable-ring#/", pp. 1-22, Aug. 20, 2019.

* cited by examiner

WIRELESS WEARABLE PUSH-TO-TALK (PTT) DEVICE

FIELD OF INVENTION

The present invention relates to a wireless wearable Push-To-Talk (PTT) device. More particularly, the invention relates to a Push-To-Talk system that allows for a multiple short-range communication either simultaneously or individually by connecting multiple short-range communication accessories. This multiple short-range communication system assists users in attaining a more secured and efficient communication.

BACKGROUND OF THE INVENTION

Bluetooth is a short range wireless technology that interconnects different electronic devices to communicate or transfer the data. The electronic devices like smart phones, laptops, PCs, printers, PDAs, smart glasses, digital cameras and headsets utilize wireless technologies which mainly work through the Bluetooth feature. Bluetooth communication provides better range than other short range communications such as infrared and RF communications.

In general, a wearable device i.e., body worn camera which is operated by the police guards or users comprises of a single Bluetooth communication which can be achieved only through wired connection. By utilizing such connection, only a single communication can be accomplished such as earphones, auxiliary camera etc. These wearable devices do not have a feature to enable three or more Bluetooth enabled accessories simultaneously with a provision to communicate with multiple devices. Some of the wearable devices are connected with wired additional components which act as intermediateries to connect multiple Bluetooth enabled accessories either simultaneously or individually. In order to avoid such problem, there is a need to provide a wearable device with three or more Bluetooth enabling features which would allow the device to communicate with multiple Bluetooth enabled accessories simultaneously.

During the usage of the body worn camera, the images which are captured cover only front view where the user stares ahead during the search or other operations. If any obstacle suddenly comes from other directions, those views cannot be captured. Therefore, the existing body worn camera systems cannot cover different directions and are too bulky to be effective. This may result in omitting important information from recording. In addition, the police and security officers or other users desire minimized electronic wearable devices which are small in size, so that a hands-free communication in a more efficient way can be achieved. Thus, there is a need to provide a wireless minimized capturing means to cover different directions in a more efficient and effective way by capturing and transmitting data (e.g., video and images) for law enforcement.

Conventional wearable Push-To-Talk (PIT) device consist of a push button through which a Push-To-Talk function can be achieved by pressing the button. During risky operations, it might become a difficult and uncomfortable process to press the push button to implement the Push-To-Talk function. Whenever an obstacle arises during the search operations, the policemen may not be able to approach the push button to activate the walkie-talkie function. This results in dragging down the capabilities of the user to achieve a successful risky operation. Therefore, there is a requirement for a minimized wearable activating means which provides an access to the officers to easily activate the Push-To-Talk function in unaware situations.

Further during certain operations, the Push-To-Talk function cannot be achieved in a private manner, where the user is required to listen the voice of the other user through the speaker provided on the wearable Push-To-Talk (PTT) device. This results in an unsecured communication between the users during certain operations or events. Therefore, a secured wireless communication is needed to carry out the Push-To-Talk conversation.

Hence, the object of the invention is to overcome the above problems to achieve a more secured and efficient wireless communication by implementing multiple short-range communication and multiple image capturing means provision.

SUMMARY OF THE INVENTION

The invention proposes a wireless wearable Push-To-Talk (PTT) device. The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

According to an aspect of the invention, the wireless wearable Push-To-Talk system, comprises, a first communication unit is configured to communicate with multiple Push-To-Talk devices, a second communication unit is configured to communicate with multiple short-range communication accessories, a wireless transceiver is configured in the second communication unit to transmit or receive the radio signals and a power unit is configured to provide rechargeable power supply to the Push-To-Talk system. The second communication unit allows the wearable Push-To-Talk system to communicate with the multiple short-range communication accessories. The second communication unit may have a provision to send live streaming or to connect a phone call.

The multiple short-range communication accessories may comprise at least a visual accessory to capture either a still image or a moving image, a hearing accessory to get activated in communication with the first communication unit or the second communication unit and a Push-To-Talk control accessory to control the push-to-talk function. The visual accessory may comprise a camera mounted eyewear which allows to capture the images from different directions. The hearing accessory is configured to get activated either during Push-To-Talk function or during phone call conversation. The multiple short-range communication accessories can be selected from short-range communication devices like Bluetooth enabled accessories which may be connected to the Push-To-Talk system either simultaneously or individually.

According to other aspect of the invention, the visual accessory may comprise a frame, a pair of glasses are fixed to the frame, a mini capturing means is mounted on the frame to capture images from different directions, a user interface means is mounted on the frame to activate the mini capturing means and a control circuit is equipped within the frame to transmit the control signals. The mini capturing means may be an image or video capturing device such as a CCD camera. Two or more mini capturing means can be mounted on the frame to cover multiple directions based on the requirement. The control circuit may comprise a wireless transceiver to transmit the images to the wearable Push-To-Talk system.

According to another aspect of the invention, the Push-To-Talk control accessory, comprises a circular means provided with an opening to accommodate user's finger, an elastic means is engaged within the circular means to provide tight grip to the user's finger, an activating means is fixed to the circular means to control the Push-To-talk function and a control circuit is equipped within the circular means to transmit the control signals. The Push-To-Talk control accessory is a ring like structured accessory which may be a finger ring. The finger ring may be formed from a series of interconnected segments, where the user can add or subtract segments to achieve a desired ring size. The activating means may be a push button or a clicker or a touch screen or a sensor and the like and it may instead or in addition be electrically operated by sensing the touch or proximity. The placement of the activating means can be adjusted to fit either to a left hand user or to a right hand user. The control circuit may comprise a wireless transceiver to transmit the control signals to the wearable Push-To-Talk system and it may also be programmed to achieve the control of other Bluetooth enabled accessories of user interest such as the Bluetooth enabled visual accessory, the Bluetooth enabled hearing accessory and other accessories that are capable enough to communicate wirelessly.

DESCRIPTION OF DRAWINGS

The accompanying drawings, which are incorporated in and constitute a part of the specification, illustrate an embodiment of the invention, and, together with the description, serve to explain the principles of the invention.

DETAILED DESCRIPTION OF DRAWINGS

Figure 1A:
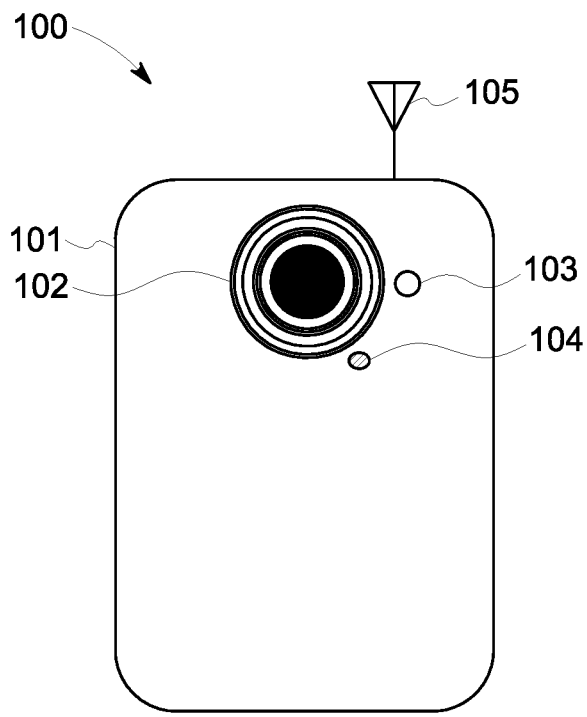
FIG. 1a is a schematic front view of a wireless wearable push-to-talk (PIT) device 100, according to an exemplary embodiment of the present invention.

An exemplary embodiment of the present invention will be described in reference to the accompanying drawings. Wherever possible, same or similar reference numerals are used in the drawings and the description to refer to the same or like parts or steps.

The wireless wearable Push-to-Talk (PTT) device is a body worn camera utilized for the utility of the policemen or other users. The device is worn onto their body with the assistance of a clip provided on the backside of the device. The device assists the user in capturing either moving or still images along with the provision of the push-to-talk function.

FIG. 1a illustrates a front view of the wireless wearable push-to-talk (PTT) device 100 which comprises a body frame 101, an image capturing means 102, a flash light 103, a microphone 104 and an antenna 105. The image capturing means 102 on the device 100 is configured to capture images which can be operated through a button provided on the device 100. The microphone 104 assists the officer in accomplishing push-to-talk function. The antenna 105 is provided to transmit or receive radio signals to support various wireless communications such as wireless internet, mobile communication, short-range communication and thereof.

Figure 1B:
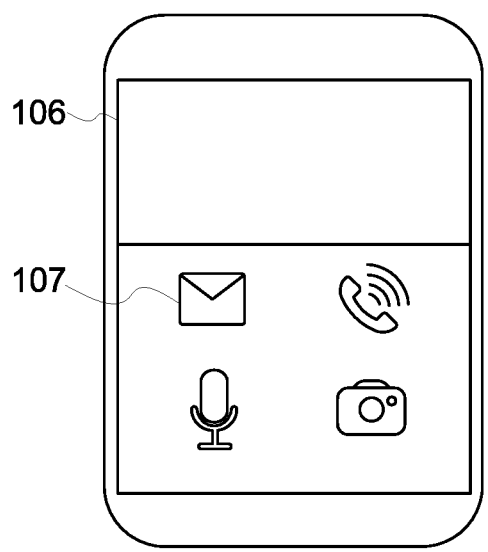
FIG. 1b is a schematic rear view of a wireless wearable push-to-talk (PTT) device 100, according to an exemplary embodiment of the present invention.

FIG. 1b illustrates a rear view of the wireless wearable push-to-talk (PTT) device 100 which comprises a touch screen 106 that acts as an interface system between the device 100 and the user. The touch screen 106 displays the output information processed in the device 100. The touch screen 106 mainly displays different communicable interface icons 107 which are the replica of the icons generally seen on mobile phones. Examples are shown in the figure such as audio recording, messaging, camera, phone calls etc.

Figure 2:
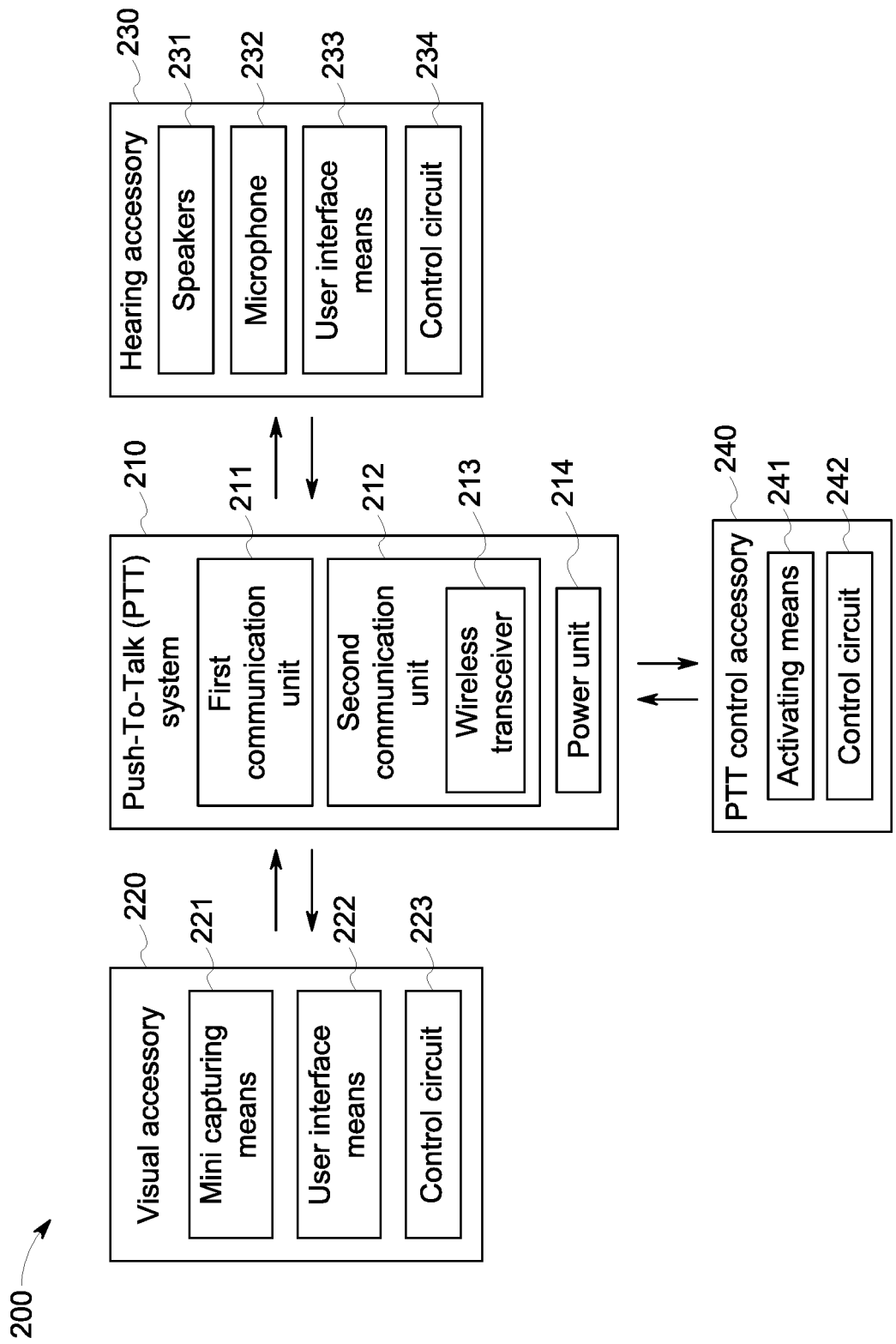
FIG. 2 is a block diagram representation of a wireless wearable push-to-talk (PTT) system in communication with short-range communication accessories.

According to an exemplary embodiment, FIG. 2 shows a block diagram 200 of the wireless wearable push-to-talk (PTT) system which communicates wirelessly with short-range communication accessories. The wireless wearable push-to-talk (PTT) device is operated using push-to-talk (PTT) system. The block diagram of the Push-To-Talk system represents the modules that mainly support the short-range communication. The short-range communication which will be discussed in the entire description is selected to be a Bluetooth communication.

The block diagram 200 comprises a push-to-talk (PTT) system 210, a visual accessory 220, a hearing accessory 230 and a Push-To-Talk control accessory 240. The Push-To-Talk system 210 comprises a first communication unit 211, a second communication unit 212, a wireless transceiver 213 and a power unit 214. The first communication unit 211 is configured to communicate with multiple other Push-To-Talk devices. The second communication unit 212 is configured to communicate with multiple Bluetooth enabled accessories. The wireless transceiver 213 is configured in said second communication unit to transmit or receive radio signals. The second communication unit 212 and the wireless transceiver 213 support the Bluetooth communication between the Push-To-Talk system 210 and other Bluetooth enabled accessories 220, 230, 240 either simultaneously or individually. The second communication unit may have a provision to send live streaming or to connect a phone call. The power unit 214 may provide a rechargeable power supply to the Push-To-Talk system 210. The visual accessory 220 is configured to capture either a still image or a moving image. The hearing accessory 230 is configured to get activated in communication with said first communication unit or said second communication unit. The Push-To-Talk control accessory is configured to control push-to-talk function.

The visual accessory 220 comprises a mini capturing means 221, a user interface means 222 and a control circuit 223. The mini capturing means 221 is configured as an auxiliary capturing means to cover images in different directions which could not be covered by the image capturing means 102 of the Push-To-Talk device 100. The user interface means 222 is configured to activate said mini capturing means 221. The control circuit 223 is equipped within said visual accessory 220 to transmit control signals to the Push-To-Talk system 210.

The hearing accessory 230 comprises speakers 231, a microphone 232, a user interface means 233 and a control circuit 234. The microphone 232 is an audio encoder and decoder to convert the voice signals. The user can activate different functions through the user interface means 233 which is configured to the hearing accessory 230. The control circuit 234 is equipped within the accessory 230 to allow the communication between the Push-To-Talk system 210 and the hearing accessory 230. The hearing accessory 230 is configured to get activated during the push-to-talk function and even during the phone call conversation. The hearing accessory 230 can also be operated in multipoint mode which can be paired with other Bluetooth enabled devices such as a smart watch, an eyewear and the like.

The Push-To-Talk control accessory 240 comprises an activating means 241 and a control circuit 242. The Push-To-Talk control accessory 240 is a wearable accessory. The activating means 241 present on the wearable accessory allows the user to simply control the push-to-talk function. The control circuit 242 allows to transmit the wireless control signals to the Push-To-Talk system 210 to accomplish the Push-To-Talk function.

Figure 3:
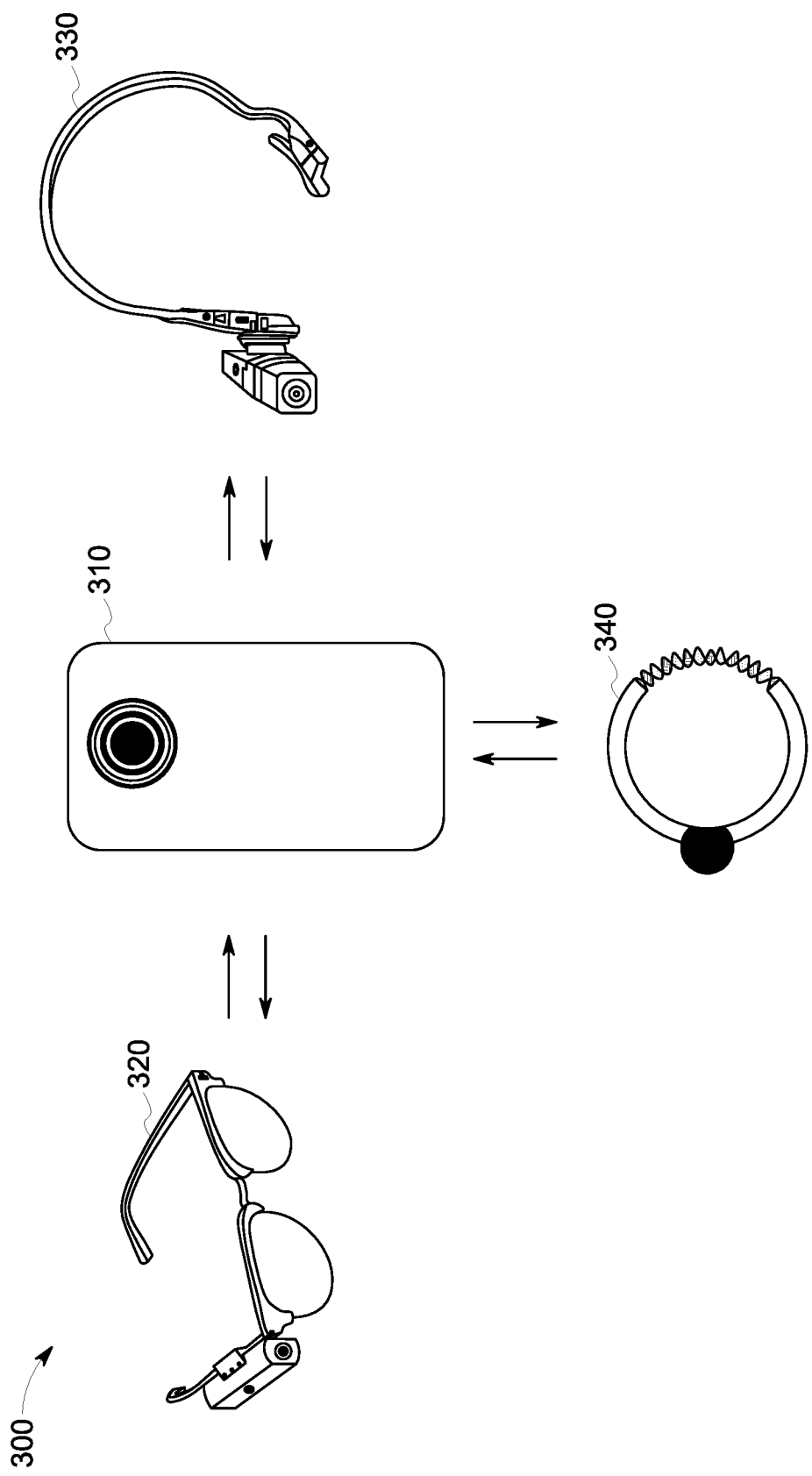
FIG. 3 shows a schematic representation of a Push-To-Talk device in communication with three Bluetooth enabled accessories.

According to an exemplary embodiment, FIG. 3 shows a schematic representation of the Push-To-Talk device in communication with three Bluetooth enabled accessories 300. The Push-To-Talk device 310 is communicable with the visual accessory 320, the hearing accessory 330 and the Push-To-Talk control accessory 340 either simultaneously or individually. The visual accessory 320 and the hearing accessory 330 both are depicted with mini capturing means, each mounted on them to capture images.

Figure 4:
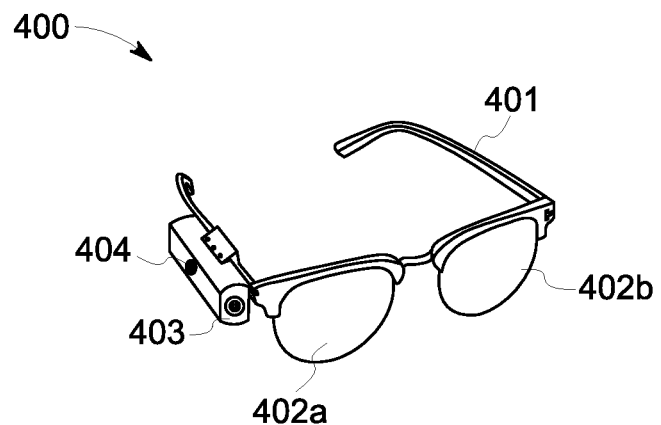
FIG. 4 depicts a Bluetooth enabled visual accessory, according to an exemplary embodiment of the present invention.

According to an exemplary embodiment, FIG. 4 represents a Bluetooth enabled visual accessory 400 which is a camera mounted eyewear. The accessory 400 comprises a frame 401, a pair of glasses 402a and 402b, a mini capturing means 403 and a user interface means 404. The mini capturing means 403 may be an image or video capturing device such as mini sized CCD camera which is mounted on the frame 401 to capture either moving or still images. This placement allows the camera to cover wide area whenever the user turns the head in different directions. The placement can also be changed to other sections of the frame 401 apart from the placement shown in the figure. Further, two or more capturing means 403 can be mounted on the accessory 400 based on the requirement to cover multiple directions.

The user interface means 404 is an on/off switch which is used to activate the mini capturing means 403. A control circuit may be equipped within the frame 401 to transmit the control signals to the wearable Push-To-Talk system. The control circuit is configured to send images captured by the camera to a remote device via Bluetooth. The control circuit is configured to send the images either in real-time or in offline. The images can be stored in the memory provided in the control circuit. A rechargeable power means can be provided to supply power to the accessory 400.

During any search or rescue operations, the accessory 400 can be worn so that if any obstacle suddenly comes from other directions, those views can also be captured without the assistance of the Push-To-Talk front capturing means. This allows to cover different directions which cannot be captured by the Push-To-Talk front capturing means. This Bluetooth feature adds more capability to the policemen or users in their operations or events. Further, accessory 400 can be activated either through the on/off switch or through the second communication unit of the Push-To-Talk device. Thus, the accessory 400 provides more efficient and effective way of capturing and transmitting data such as video recordings and image pictures thereby assisting in law enforcement.

Figure 5:
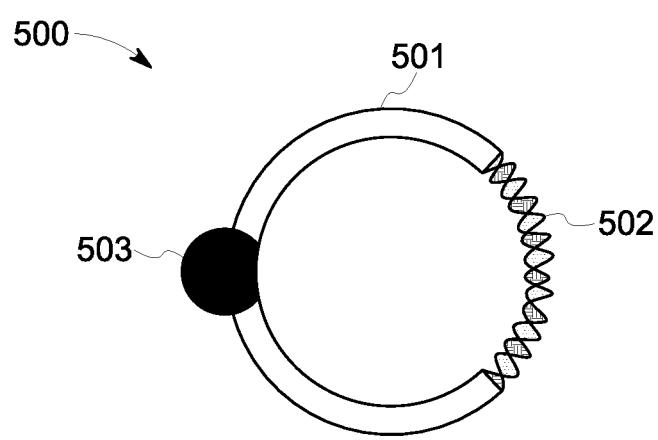
FIG. 5 depicts a Bluetooth enabled Push-To-Talk control accessory, according to an exemplary embodiment of the present invention

According to an exemplary embodiment, FIG. 5 represents a Bluetooth enabled Push-To-Talk control accessory 500 which depicts a ring like structured accessory. The Push-To-Talk control accessory 500 may be a finger ring which comprises a circular means 501, an elastic means 502 and an activating means 503. The circular means 501 is provided with an opening to accommodate the user's finger which can be adjustable to fit different size fingers.

The circular means 501 can be made from either a rigid or a semi rigid material such as metal, plastic, elastic and etc. The circular means 501 can be made from a metal which may comprise a gold, silver, platinum, and the like. The elastic means which is engaged within said circular means provide tight grip to the finger. The activating means 503 may be a push button or a clicker or a touch screen or a sensor and the like which may be in any shape or size. In an exemplary embodiment, the activating means 503 is a push button. In other embodiments, the activating means 503 may instead or in addition be electrically operated by sensing the touch or proximity, e.g., through the capacitance of a user's finger. The placement of the activating means can be further adjusted to fit either to a left hand user or to a right hand user.

A control circuit may be equipped within said circular means 501 to transmit the control signals to the Push-To-Talk device to control the Push-To-Talk function. The control circuit may comprise a wireless transceiver to transmit control signals to said wearable Push-To-Talk system. The control circuit can also be programmed to achieve the control of other Bluetooth enabled accessories of user interest such as Bluetooth enabled visual accessory, Bluetooth enabled hearing accessory and other devices that are capable enough to communicate wirelessly, but they are not specifically described in the invention. A rechargeable power means can be provided within the accessory 500 to supply power.

The control accessory 500 assists the policemen or user during the search operations or events to activate the control push-to-talk function of the Push-To-Talk device by simply pressing the activating means 503.

According to an embodiment of the present invention, a method for controlling the Push-To-Talk system using the Bluetooth enabled Push-To-Talk control accessory 500 is as follows. Initially, when an obstacle arises during the search operations, the user may not be able to approach the push button present on the Push-To-Talk device to activate the Push-To-Talk function. Therefore, the user can simply push the button provided on the finger ring. Then the command associated with the button press can be transmitted to the second communication unit of the Push-To-Talk device through the control circuit of the finger ring. This command will accomplish the push to talk function in the Push-To-Talk device.

In other embodiments, the Push-To-Talk control accessory 500 may be a ring which can be formed from a series of interconnected segments, where a user can add or subtract segments to achieve the desired ring size. A mini capturing means can be fixed to the accessory 500 as an additional feature.

Thus, the Push-To-Talk device of the present invention is capable enough to communicate with three Bluetooth enabled accessories. By modifying the configuration of the system, the proposed Push-To-Talk device can still be extended to operate with multiple Bluetooth enabled accessories apart from the accessories described in the invention.

Additional mini capturing means can be provided on other Bluetooth enabled accessories or accessories which are in communication with the Push-To-Talk device to assist the operator. Further the additional capturing means can optionally be placed on any Bluetooth enabled device provided or used on upper part of the body like on eyewear, earpiece, headset and such devices thereof which help in providing better visibility and also have better image capturing in a different angle and different plane. Further, the Push-To-Talk device can be applicable to areas where the short range communication necessity exists.

The proposed Push-To-Talk device with multiple Bluetooth communication system can be applicable in wide application areas such as law reinforcement like police, military, navy and air force, space stations, trekking, wildlife photography, sports, warehouses, industries like oil and gas, industrial automation, automobile industry, film industry, workshops, shopping malls and the like.

It will readily be apparent that numerous modifications and alterations can be made to the processes described in the foregoing examples without departing from the principles underlying the invention, and all such modifications and alterations are intended to be embraced by this application.

What is claimed is:

1. A wireless wearable Push-To-Talk system configured to operate a wireless wearable push-to-talk (PTT) device, comprising:
   a first communication unit configured to allow communication with multiple Push-To-Talk devices;
   a second communication unit configured to allow interface of multiple short-range communication accessories and cellular networks for communication, wherein said multiple short-range communication accessories are connected to the Push-To-Talk system either simultaneously or individually, said multiple short-range communication accessories comprise at least:
   a visual accessory to capture either a still image or a moving image and to send captured images to the Push-To-Talk system or to a remote device, wherein the visual accessory comprises a mini capturing means configured as an auxiliary capturing means to cover images in different directions;
   a hearing accessory to get activated in communication with said first communication unit or said second communication unit; and
   a wearable Push-To-Talk control accessory configured with an activating button to control or activate Push-To-Talk function through said second communication unit; and
   a power unit configured to provide rechargeable power supply to said Push-to Talk system, whereby said second communication unit allows said wearable Push-To-Talk system to communicate with said multiple short-range communication accessories simultaneously.

2. The wireless wearable Push-To-Talk system as recited in claim 1, wherein said multiple short-range communication accessories are selected from short-range communication devices like Bluetooth enabled accessories.

3. The wireless wearable Push-To-Talk system as recited in claim 1, wherein said second communication unit has a provision to send live streaming or to connect a phone call.

4. The wireless wearable Push-To-Talk system as recited in claim 1, wherein said first communication unit comprises a Push-To-Talk radio transceiver to allow Push-To-Talk communication.

5. The wireless wearable Push-To-Talk system as recited in claim 1, wherein said second communication unit comprises a Bluetooth radio transceiver and a cellular radio transceiver to transmit or receive radio signals to thereby allow Bluetooth communication and phone call communication.

* * * * *